US007536458B2

(12) United States Patent
Teodosiu et al.

(10) Patent No.: US 7,536,458 B2
(45) Date of Patent: May 19, 2009

(54) DISTRIBUTION OF BINARY EXECUTABLES AND CONTENT FROM PEER LOCATIONS/MACHINES

(75) Inventors: Dan Teodosiu, Palo Alto, CA (US); Xavier Boyen, Mountain View, CA (US)

(73) Assignee: Microsoft Corporation, Redmond, WA (US)

( * ) Notice: Subject to any disclaimer, the term of this patent is extended or adjusted under 35 U.S.C. 154(b) by 223 days.

(21) Appl. No.: 11/112,794

(22) Filed: Apr. 21, 2005

(65) Prior Publication Data

US 2005/0198388 A1  Sep. 8, 2005

Related U.S. Application Data

(62) Division of application No. 09/948,466, filed on Sep. 6, 2001.

(60) Provisional application No. 60/267,901, filed on Feb. 9, 2001.

(51) Int. Cl.
*G06F 15/173* (2006.01)
(52) U.S. Cl. ..................................... 709/225
(58) Field of Classification Search ......... 709/224–226; 717/176, 177
See application file for complete search history.

(56) References Cited

U.S. PATENT DOCUMENTS

| | | | |
|---|---|---|---|
| 5,680,547 A | 10/1997 | Chang | |
| 5,761,499 A | 6/1998 | Sonderegger | |
| 5,845,077 A | 12/1998 | Fawcett | |
| 5,870,554 A | 2/1999 | Grossman et al. | |
| 5,931,947 A * | 8/1999 | Burns et al. | 726/4 |
| 5,944,783 A * | 8/1999 | Nieten | 709/202 |
| 5,974,547 A | 10/1999 | Klimenko | |
| 6,026,430 A * | 2/2000 | Butman et al. | 709/203 |
| 6,185,678 B1 | 2/2001 | Arbaugh et al. | |

(Continued)

FOREIGN PATENT DOCUMENTS

EP   0677809 A1   10/1995

(Continued)

OTHER PUBLICATIONS

Michael S. Marmor, "Make the P2P Leap with Toadnode", Retrieved at <<www.webtechniques.com>>, Dec. 2000, pp. 44-49. (The corresponding document was previously submitted in connection with parent U.S. Appl. No. 09/948,466 and is not being resubmitted herewith per 37 CFR 1.98(d).).

*Primary Examiner*—Andrew Caldwell
*Assistant Examiner*—Benjamin Ailes

(57) ABSTRACT

Binary executables are distributed in a distributed manner by equipping a server with a bootstrap program. The server provides the bootstrap program to a client computer in response to the client's request for the binary executables. The bootstrap program is designed to enable the client computer to obtain the binary executables in one or more portions from one or more peer locations that have already downloaded the said binary executables. In one embodiment, the bootstrap program also monitors the performance associated with obtaining the portions of the binary executables, and reports the performance data to a resource naming service that tracks peer locations that cache the binary executables. In one embodiment, the binary executables also includes a component that registers the client computer as a peer location that caches the binary executables, and provides the binary executables to other client computers responsive to their requests. In various embodiments, content is distributed in like manner.

16 Claims, 4 Drawing Sheets

U.S. PATENT DOCUMENTS

| | | | |
|---|---|---|---|
| 6,230,269 B1 | 5/2001 | Spies et al. | |
| 6,289,388 B1 * | 9/2001 | Disney et al. | 709/238 |
| 6,317,826 B1 | 11/2001 | McCall et al. | |
| 6,327,252 B1 * | 12/2001 | Silton et al. | 370/256 |
| 6,374,289 B2 * | 4/2002 | Delaney et al. | 709/203 |
| 6,430,618 B1 * | 8/2002 | Karger et al. | 709/225 |
| 6,438,592 B1 | 8/2002 | Killian | |
| 6,735,692 B1 * | 5/2004 | Murphrey et al. | 713/1 |
| 6,742,023 B1 | 5/2004 | Fanning et al. | |
| 6,907,463 B1 | 6/2005 | Kleinpeter, III et al. | |
| 7,162,538 B1 * | 1/2007 | Cordova | 709/238 |

FOREIGN PATENT DOCUMENTS

| | | |
|---|---|---|
| WO | 8905551 A1 | 6/1989 |

* cited by examiner

DISTRIBUTION OF BINARY EXECUTABLES AND CONTENT FROM PEER LOCATIONS/MACHINES

RELATED APPLICATION

This application is a Divisional Application of U.S. patent application Ser. No. 09/948,466, entitled "Distribution of Binary Executables and Content From Peer Locations/Machines", filed Sep. 6, 2001, which claims priority to provisional application No. 60/267,901, entitled "System and Method for Distributing Binary Executables and Content From Peer Machines", filed on Feb. 9, 2001, both of which are hereby incorporated herein by reference.

FIELD OF THE INVENTION

The present invention relates to the field of distributed computing. More specifically, the present invention relates to distribution of binary executables and content in a distributed manner, from peer locations or machines (hereinafter, simply peer locations).

BACKGROUND INFORMATION

As a result of improvements in processing power, storage capacity, and connection bandwidth, the Internet is evolving from a set of powerful servers and slow, intermittently-connected clients to a network where clients are powerful and often linked by high-speed, always-on connections.

At the same time, the Web has become an important medium for the distribution of digital content. Many software applications (such as, for instance, virus detection applications, computer games, educational materials and videos, software updates, paid music subscription services, etc.) use the Web as the primary means of distribution for their binaries, for updates of those binaries, and for distributing up-to-date data or content files. And digital media distribution via the Web has become common for many categories of content.

With large files, the central server model of distribution becomes a significant bottleneck for both the Web site and the end-user. Software application developers must spend significant time, effort and money to maintain and scale Web operations as the rate of download of their applications grows. Content producers must similarly develop core competencies in network operations to manage distribution. And user experience for downloading files from popular and overloaded servers is often poor.

Content Delivery Networks (CDNs) have emerged to partially address this solution by caching software, media and Web content at "edge" servers located closer on the network to end-user machines. Yet the cost to the CDNs of maintaining these edge servers is high, and thus so is the cost of the service to the Web sites.

A significant opportunity for content distribution that has not been leveraged to date exists in the under-utilized bandwidth, storage, and processing capabilities of user machines at the edges of the Internet. Content and application businesses have numerous users with powerful computers and high-speed connections that are currently mainly used unidirectionally, namely for downloading content. Many of these users would be willing to share some of their available upstream bandwidth in return for a better download experience, especially since they would not have to pay for this additional bandwidth, given the flat-rate pricing for most consumer ISPs.

A Distributed Content Distribution Network (D-CDN) that could leverage the unused storage resources and upstream bandwidth on end-user machines would not only provide huge savings in terms of operating costs for content and application businesses that distribute their data on the Web, but would also improve the end-user experience by offering improved scalability with demand, and thus faster and more reliable downloads.

Accordingly, such a D-CDN is desired.

SUMMARY

Binary executables are distributed to client computers in a distributed manner by equipping a server with a small bootstrap program. The server provides the bootstrap program to a client computer in response to the client computer's request for the binary executable. The bootstrap program is designed to execute on the client computer in order to enable the client computer to obtain the actual binary executable in one or more portions, or stripes, from one or more peer locations that have already downloaded the desired version of the binary executable.

In one embodiment, the binary executable is obtained from multiple peer locations in a striped manner. The bootstrap program obtains the one or more peer locations from a Resource Naming Service (RNS) server that tracks peer locations caching the binary executable.

In one embodiment, the RNS server also balances the stripe serving load on the peer locations by using an intelligent algorithm to distribute the load over the available peer locations, thus avoiding overloading any of the peer locations.

In one embodiment, the bootstrap program also monitors the performance and the integrity associated with obtaining the binary executable stripes from the peer locations, and reports the performance and integrity data back to the RNS server, which advantageously uses this data to improve the distribution of future requests over the available peer locations.

In one embodiment, the binary executable also includes a client component that registers the client computer as a peer location of the binary executable, and serves the binary executable in portions, or stripes, to other client computers in response to their requests.

In one embodiment, a efficient and secure communication protocol is used between client component and RNS server to advantageously ensure that the information reported to the RNS server is difficult to spoof by an attacker, and to allow the RNS server to track instances of the client component through network address changes.

In one embodiment, the client component, with the support of the RNS server, also can be used to obtain content in portions, or stripes, from peer locations that have already downloaded said content.

In one embodiment, the client component registers the client computer as a peer location of the downloaded content, and can subsequently serve the content in portions to other client computers in response to their requests.

BRIEF DESCRIPTION OF DRAWINGS

The present invention will be described by way of exemplary embodiments, but not limitations, illustrated in the accompanying drawings in which like references denote similar elements, and in which.

DETAILED DESCRIPTION

As summarized earlier, the present invention enables binary executables and content to be distributed to client computers in a distributed manner from peer locations, which are similar client computers that have already downloaded said binary executables and content. In the description to follow, the present invention will be described in detail in the context of two scenarios:

(1) Initial distributed downloading of a new version of a client software, more specifically, the downloading of the client software's installation files;

(2) Subsequent distributed downloading of content, or large data files, or binary executables, for use e.g. by the client software, or by any other software.

Various aspects of the present invention will be described. However, the present invention may be practiced with only some or all aspects of the present invention. For purposes of explanation, specific numbers, materials and configurations are set forth in order to provide a thorough understanding of the present invention. However, the present invention may be practiced without some of the specific details. In other instances, well-known features are omitted or simplified in order not to obscure the present invention.

Parts of the description will be presented in terms of operations performed by a processor based device, using terms such as request, programs, download, and the like, consistent with the manner commonly employed by those skilled in the art to convey the substance of their work to others skilled in the art. As well understood by those skilled in the art, the quantities take the form of electrical, magnetic, or optical signals capable of being stored, transferred, combined, and otherwise manipulated through mechanical, electrical and/or optical components of the processor based device. The term "processor" includes microprocessors, micro-controllers, digital signal processors, and the like, that are standalone, adjunct or embedded.

Various operations will be described as multiple discrete steps in turn, in a manner that is most helpful in understanding the present invention. However, the order of description should not be construed as to imply that these operations are necessarily order dependent. In particular, these operations need not be performed in the order of presentation.

Further, the description repeatedly uses the phrase "in one embodiment", which ordinarily does not refer to the same embodiment, although it may.

Distributed Downloading of Client Software

Figure 1:
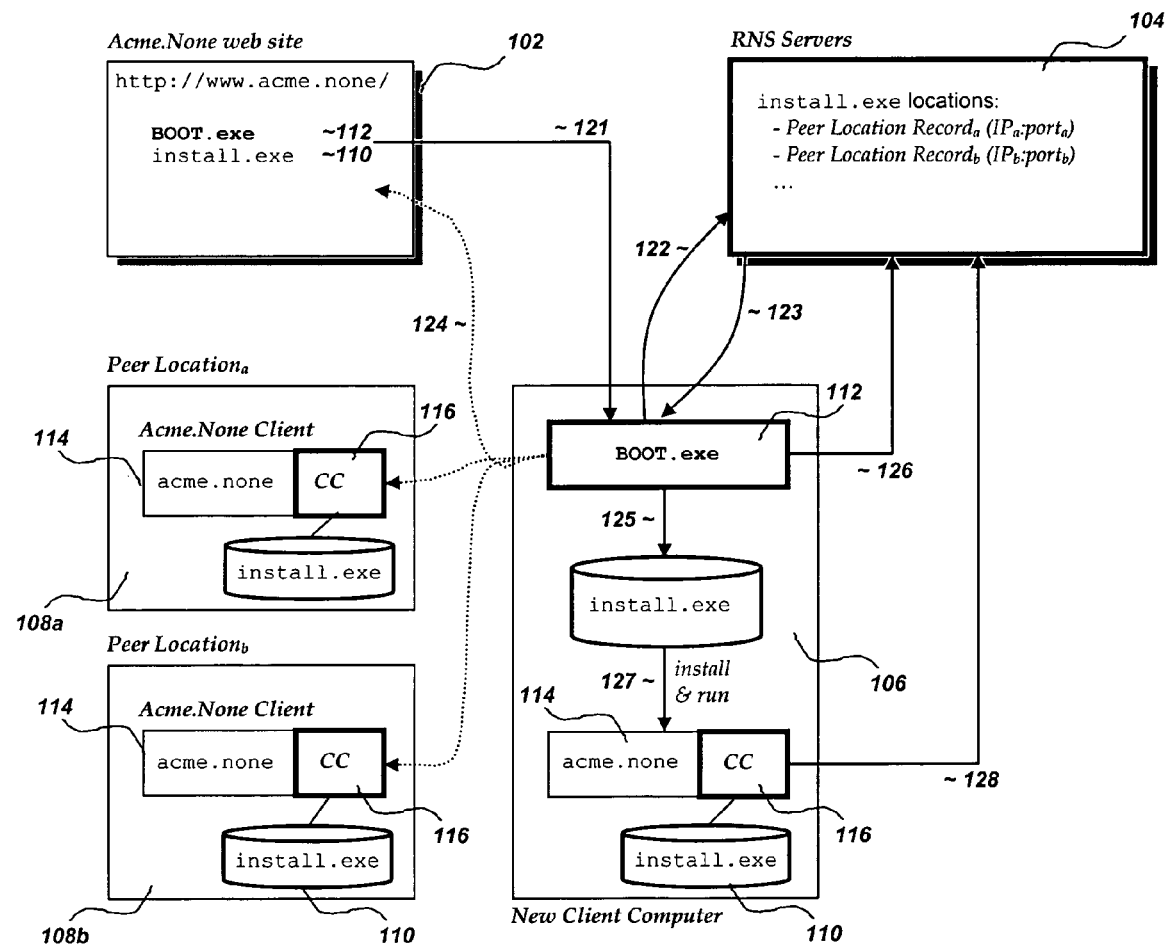
FIG. 1 illustrates the present invention, including a bootstrap program, a resource naming service (RNS) server, and a client software having a client component, to enable distributed downloading of binary executables from one or more peer locations by a new client computer, in accordance with one embodiment.

Referring now to FIG. 1, wherein a block diagram illustrating the present invention, including a bootstrap program "BOOT.exe" 112, one or more RNS servers 104, and a client component 116 incorporated in a client software 114, to enable client software 114 to be distributed to new client computer 106 in a distributed manner from any number of peer locations 108a-108b, in accordance with one embodiment.

In FIG. 1, the present invention is illustrated in the context of an example initial downloading of a client software 114, hereinafter for the purpose of illustration called "acme.none", by a new client computer 106. From the perspective of new client computer 106, client software 114 is available from the Acme.None web site (which is a fictitious web site used for illustrative purposes), containing one or more web servers 102. However, by virtue of the present invention, client software 114, packaged for installation on client computer in the form of its installation executable "install.exe" 110, in most instances can be advantageously downloaded on new client computer 106 in stripes, in a distributed manner, from one or more peer locations 108a-108b that have already downloaded and installed client software 114. Although only two locations, 108a and 108b, are shown in FIG. 1, the present invention may be practiced with any number of peer locations.

As illustrated, web server 102, RNS server 104, new client computer 106 and peer locations 108a-108b are communicatively coupled to each other over a plurality of communication links. Except for the teachings of the present invention incorporated, each of these elements may be any one of a number of client and server computing devices known in the art. For example, web server 102 and RNS server 104 may be server computing devices available from IBM of Armonk, N.Y. or Sun Microsystems of Menlo Park, Calif. Client computing devices 106 and 108a-108b may be palm-sized computing devices (including wireless mobile phones and personal digital assistants), notebook sized computing devices, desktop computing devices, set-top boxes and so forth, available from e.g. Dell Computer of Austin, Tex. and Apple Computer of Cupertino, Calif.

The communication links between new client computer 106 and web server 102, RNS server 104 and peer locations 108a-108b may be any one of a number of communication links known in the art, including but not limited to modem connections or digital subscriber line (DSL) connections established over private and/or public networks. The communications may be conducted via any one of a number known messaging and communication protocols. In one embodiment, the communication links are established over the Internet, and the communications are conducted in accordance with the Transmission Control Protocol/Internet Protocol (TCP/IP).

Before further describing the present invention, it should be noted that while for ease of understanding, only one each of new client computer 106, web server 102, and RNS server 104, respectively, and only two peer locations 108a-108b are shown in FIG. 1, the present invention may be practiced with any one of a number of these elements. Similarly, those skilled in the art will appreciate that the installation file "install.exe" 110 can represent any form of software or content distribution or upgrade, including self-unzipping archives, patches, etc., as well as any collection of installation or upgrade files that can be downloaded as a unit.

Continuing to refer to FIG. 1, the operational flow of the present invention for downloading client software 114 by new client computer 106 in a distributed manner from peer locations 108a-108b, in accordance with one embodiment, will now be described.

Operation 121. In one embodiment, a user of new client computer 106 first visits the Acme.None web site 102 and clicks on a "Download" option presented e.g. on a web page (not shown in FIG. 1). The "Download" option comprises a link, which points to download bootstrap program "BOOT.exe" 112, a relatively small executable. As a result, the relatively small executable "BOOT.exe" 112 is downloaded from the Acme.None web site 102 onto new client computer 106, and started thereon. As those skilled in the art will appreciate, the download of bootstrap program 112 takes much less time than that of the actual acme.none installation executable "install.exe" 110, since "BOOT.exe" 112 is typically much smaller than "install.exe" 110. In an alternate embodiment, the download of the small executable "BOOT.exe" 112 can be initiated through any of the other means known to those skilled in the art, e.g. through an automatic software update procedure.

Operation 122. Upon being given execution control, bootstrap program 112, executing on new client computer 106, starts by sending a request to RNS server 104, asking RNS server 104 for a list of peer locations that are caching copies of the file "install.exe" 110, and can responsively provide portions, or stripes, of "install.exe" 110. In one implementation, if RNS server 104 is down, cannot provide an answer, or is unreachable for whatever reason, bootstrap program 112 assumes the list of peer locations is empty, and skips directly to operation 124 below.

Operation 123. At RNS server 104, upon receipt of the request for a list of peer locations for "install.exe" 110, RNS server 104 determines whether new client computer 106 should perform the download from one or more peer locations, or whether new client computer 106 is better off downloading the "install.exe" file 110 directly from the Acme.None web site 102. Any one of a number of heuristics may be employed to perform the determination. For instance, if new client computer 106 is sitting behind a caching proxy, it should be allowed to use that proxy, since this does not impose any load on the Acme.None web servers 102 and may benefit other client computers sitting behind the same caching proxy.

Assuming RNS server 104 determines that downloading from one or more peer locations is beneficial, RNS server 104 picks a set of peer locations, from its master list of caching peer locations and returns this smaller list to new client computer 106. In one embodiment, the returned list also includes a pre-computed hash (such as an MD5 signature) and the size of the "install.exe" file 110.

In a preferred embodiment, the peer locations are chosen based on their availability, as well as their estimated performance, to avoid overloading one particular peer location while providing a good enough aggregate bandwidth to downloading new client computer 106. In alternate embodiments, other criteria may be employed in selecting the peer locations to return.

In one embodiment, the returned list of peer locations is made up of the network addresses and network ports of the peer locations. These network addresses and port numbers may not be fixed, but may change every time the peer locations come online.

Operation 124. Upon receipt of the list of peer locations, bootstrap program 112 contacts the peer locations in the list to download the installation file "install.exe" 110. In one embodiment, the contact is made using the Hypertext Transfer Protocol (HTTP). In other embodiments, other protocols, including proprietary protocols, may be used instead. In a preferred embodiment, peer locations 108a-108b are contacted for portions of the installation files in a striped manner. The striping algorithm is used to increase the aggregate download bandwidth from peer locations 108a-108b and thus to reduce the total download time. In various embodiments, bootstrap program 112 is advantageously designed to gracefully recover from transient conditions such as failures of one or more of peer locations 108a-108b.

In particular, if the list of peer locations returned by RNS server 104 is empty, or if none of the given peer locations 108a-108b responds or provides acceptable performance, bootstrap program 112 reverts to downloading the installation file "install.exe" 110 from the Acme.None web site 102. In alternate embodiments, bootstrap program 112 may apply additional criteria and merely contact a subset of the list of peer locations identified.

Operation 125. After completing the download, bootstrap program 112 assembles the various stripes into one file, which corresponds to the same binary data as the "install.exe" 110 available from the Acme.None web site. In various embodiments, the individual stripes may be discarded after assembly.

For the earlier embodiment, where a pre-computed hash (such as an MD5 signature) is also provided in operation 123 by the RNS server 104 together with the list of peer locations 108a-108b, bootstrap program 112 further independently re-computes the hash for the re-assembled file. In one embodiment, if the independently re-computed signature does not match the one received from RNS server 104, the entire file is reloaded from the Acme.None web site 102.

Operation 126. In the presently preferred embodiments, bootstrap program 112 further accumulates download performance data and integrity data while downloading the various stripes of the installation file "install.exe" 110 from peer locations 108a-108b. Upon verifying the integrity of the downloaded file portions, bootstrap program 112 further sends a download performance and integrity summary report to RNS server 104. Preferably, the report contains performance data for each source, i.e. peer location 108a-108b. Preferably, if the independently computed hash (such as the MD5 signature) for the downloaded content did not match the expected one, the report also contains integrity attributes describing the downloaded file stripes, such that RNS server 104 may determine the offending peer location(s) 108a-108b in the event one or more of peer locations 108a-108b purposely spoofed the download, or for whatever reason served bad data.

Operation 127. Additionally, upon successfully verifying the downloaded file portions, bootstrap program 112 causes the copy of "install.exe" 110 assembled in operation 125 to be started or activated. In one embodiment, during the subsequent installation of client software 114, the user will be asked if he agrees to serve as a caching peer location for client software 114, and to responsively provide the installation file "install.exe" 110 of client software 114 to other requesting client computers. In alternate embodiments, additional facilities may also be provided to allow the user to subsequently and selectively consent, as well as to temporally disable and thereafter re-enable the caching and responsive provision of the installation files of client software 114.

Operation 128. In preferred embodiments of the present invention, client software 114 is advantageously equipped with client component 116 (CC in FIG. 1), which is activated when installed client software 114 is started. In other embodiments, client component 116 could be permanently active in the background, irrespective of whether the client software 114 is running.

For various implementations of these embodiments, client component 116 selects a port on which to listen for incoming requests for portions of the installation file "install.exe" 110 of client software 114 (e.g. in the form of HTTP transfer requests) from other computing devices, and notifies RNS server 104 of its availability to participate in the distributed downloading of the installation file of client software 114, including its network address and the selected port number. Thereafter, client component 116 listens to the selected port, and services incoming requests for the selected portions of the installation file of client software 114.

In various preferred embodiments, the cached copy of the installation file "install.exe" 110 of client software 114 is removed as part of the uninstallation procedure of client component 116. Preferably, RNS server 104 is notified of the effective withdrawal of client software 114 from the distributed download of the installation files.

Further, in one implementation, RNS server 104 comprises a registration function for handling the earlier described registration related interactions with client computer 106, a scheduler function for handling the earlier described peer location request related interactions with new client computer 106, and a reporter function for handling the earlier described reporting related interactions with new client computer 106. The relevant aspects of these functions, more specifically, the protocols and the peer location scheduling algorithm, will be described in further detail below. Obviously, in alternate implementations, RNS server 104 may be implemented with a different functional architecture.

Distributed Downloading of Content

Figure 2:
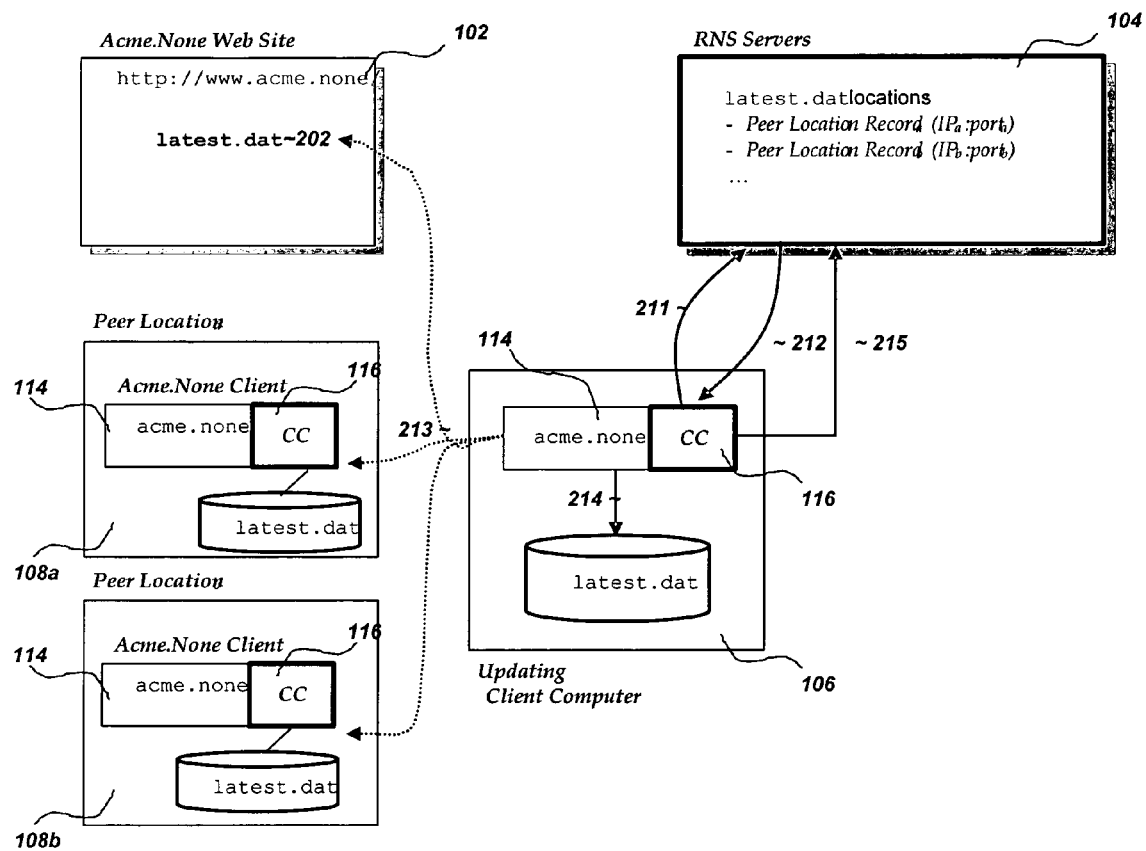
FIG. 2 further illustrates the present invention, including a client component and an RNS server, to enable distributed downloading of content from one or more peer locations by a client computer, in accordance with one embodiment.

Referring now to FIG. 2, wherein a block diagram further illustrating the present invention, including additional functions of the earlier described RNS 104 and client component 116, to enable client software 114 to be able to download content "latest.dat" 202 in a distributed manner from peer locations 108*a*-108*b*, in accordance with one embodiment, is shown. In FIG. 2, the next aspect of the present invention is illustrated in the context of an example distributed downloading of content 202, "latest.dat", by updating client computer 106. From the perspective of updating client computer 106, the master copy of content 202, "latest.dat", is available from the fictitious Acme.None web site 102. However, by virtue of the present invention, content 202, "latest.dat", in most instances can be advantageously downloaded in portions, or stripes, in a distributed manner, from one or more peer locations 108*a*-108*b* of client software 114 that have already downloaded a copy of content 202.

Again for ease of understanding, only web server 102, RNS server 104, updating client computer 106 and peer locations 108*a*-108*b* are shown. However, from the description to follow, it will be readily apparent that the present invention may be practiced with any number of these elements.

The operational flow of this aspect of the present invention proceeds as follows:

Operation 211. The "acme.none" client software 114 first signals client component 116 that the user wishes to download "latest.dat" 202. In response, client component 116 initiates the distributed download by sending a request to RNS server 104 asking it for a list of peer locations that can serve an up-to-date copy of the file "latest.dat" published at "acme.none". If RNS server 104 is down, cannot provide an answer, or is unreachable for whatever reason, client component 116 assumes the list of peer locations is empty, and skips directly to operation 213 below. For the ease of understanding, the request is described as being made to the same earlier described RNS server 104, however, in alternate embodiments, the request may be made to a different RNS server.

Operation 212. Upon receipt of the request from client component 116, RNS server 104 determines whether updating client computer 106 should perform a distributed peer download or is better off downloading "latest.dat" 202 directly from the Acme.None web site 102. As in the case of initial downloading of client software 114 described above, client computers 106 sitting a caching proxy are not good candidates for peer downloading—rather, they should be using the canonical download location, to allow the caching proxy to serve any later identical download via its cache.

If RNS server 104 determines that peer downloading is beneficial, as in the case of initial binary executable download, RNS server 104 picks a set of peer locations from its master list of peer locations that cache the content of interest (in this case, "latest.dat" 202), and returns the list to updating client computer 106. Again, in the presently preferred embodiment, the list is returned with a pre-computed hash (such as the MD5 signature) and the size of "latest.dat" 202.

Operation 213. Upon receipt of the list of peer locations 108*a*-108*b*, client component 116 contacts peer locations 108*a*-108*b* in the list. In various embodiments, the contacts are made using the HTTP protocol. Further, in various embodiments, a striping algorithm is used to increase the aggregate download bandwidth from peer locations 108*a*-108*b* and to reduce download time. In presently preferred embodiments, as before, client component 116 is designed to be able to gracefully recover from transient conditions, such as the failure of one or more of the peer locations 108*a*-108*b*.

If the list of peer locations 108*a*-108*b* returned by RNS server 104 is empty, or if none of the given peer locations 108*a*-108*b* responds or provides acceptable performance, client component 116 reverts to downloading "latest.dat" 202 from the Acme.None web site 104.

Operation 214. After completing the download, client component 116 assembles the various downloaded stripes into one file, and independently computes the hash (e.g. an MD5 signature) for the assembled file. If the independently computed signature does not match the one received from RNS server 104, the entire file is reloaded from the Acme.None web site 102. In various embodiments, upon authenticating the assembled file or upon failing to authenticate the assembled file, the individual downloaded stripes are discarded. In various embodiments, client component 116 also collects download performance and integrity data during the download.

Operation 215. Upon authenticating the assembled file, client component 116 sends a download summary report to RNS server 104. As before, this report contains performance and integrity data for each source, i.e. the actual peer locations 108*a*-108*b* from which client component 116 actually requested stripes for the download. In preferred embodiments, integrity attributes of the downloaded stripes are also provided to RNS server 104, if the independently computed signature did not match the expected one, to enable RNS server 104 to determine the offending peer location(s) 108*a*-108*b* in the event one or more of peer locations 108*a*-108*b* purposely spoofed content 202 or for whatever reason served bad data. In various embodiments, upon prompting and receiving consent from a user of client computer 106, client component 116 also signals to RNS server 104 that it is ready to serve any incoming requests for "latest.dat" 202.

Protocols

Protocols used by RNS server 104, bootstrap program 112 and client component 116 to communicate with each other, in accordance with one embodiment, will be described next (Protocols P1, P2 and P3). Depending on efficiency requirements, and the total number of clients that need to be handled by RNS server 104, the protocols to be described may be implemented either on top of UDP (User Datagram Protocol) for maximum efficiency (i.e. lowest bandwidth utilization and minimum latency), or on top of HTTP (Hypertext Transfer Protocol) for maximum compatibility with firewalls and proxies. In alternate embodiments, the protocols to be described may also be implemented on top of other standard or proprietary communication protocols.

The protocol to be followed by a client entity (CE), whether the CE is a boostrap program 112 or a client component 116, to interact with the RNS server 104, in accordance with one embodiment, is as follows (Protocol P1):

Protocol P1

1. CE→RNS: REQUEST: net_address, connection_speed, file_URL (Message M1)
2. RNS→CE: LOCATIONS: file_URL, file_size, stripe_size, signature, n, {IP:port, PeerID}$_1$ ... $_n$, {UniqueTimeStamp}$_{K\_rkey}$, (Message M2)
3. CE→RNS: REPORT: file_URL, total_time, {UniqueTimeStamp}K)K_rkey, n, {PeerID, performance, digests}$_1$ ... $_n$, Salt (Message M3)

In the first transmission, message M1, the CE requests a list of peer locations for downloading the file that can be normally found by de-referencing uniform resource locator "file_URL". The CE provides its own networking address "net_address" as part of the request. In one embodiment where the networking address "net_address" is an Internet Protocol (IP) address, RNS server 104 uses this information to determine whether the CE is connected directly to the Internet. The determination may be made by comparing the provided IP address with the one read by RNS server 104 from the network parameters of the incoming request, message M1. For example, if the address included as the value of parameter "net_address" in the request is 10.0.0.23, and the source address for the client connection is 214.49.23.12, RNS server 104 will detect that the CE is not directly connected to the Internet. In one embodiment, if the HTTP protocol is used to implement communication between CE and RNS server, the presence of any HTTP "Via" headers in a request from the CE to the RNS server, message M1, can be used to further find out whether the CE is behind a web proxy or not. In one embodiment, if it is undesirable to give out client addresses for clients that are behind a NAT (Network Address Translation device), then the CE sends as the value of the "net_address" parameter a hash of its IP address, instead of its actual IP address. In one embodiment, as part of this request, message M1, the CE also sends information about its network connection speed, in the form of parameter "connection_speed".

In the second transmission, message M2, RNS server 104 replies with a list of n peer locations, where n can be zero or greater; for each peer location, RNS server 104 sends back the network address and port number ("IP" and "port", respectively) at which that peer location can be asked to serve cached content. Additionally, RNS server 104 sends back for each peer location a distinguished peer ID ("PeerID") for use when reporting peer location download performance and integrity. The other information sent by RNS server 104 in this second transmission, message M2, includes the file size "file_size" of the requested file, a stripe size increment "stripe_size" that specifies to the CE that the size of any download stripe must be a multiple of "stripe_size", and a cryptographic hash "signature" (such as the MD5 signature) of the requested file. In various embodiments, RNS server 104 also returns an unique timestamp "UniqueTimeStamp". Preferably, the unique timestamp is sent to the CE encrypted with a key "K_rkey" that is only known to the RNS Server 104 and difficult to forge by the CE. The encrypted unique timestamp is to be used by the CE to report back to RNS server 104 following the completion of the desired download.

In various embodiments, to prevent spoofing of reports by malicious or defective CEs, the timestamp is also stored temporarily in an active list on RNS server 104, for a short period of time commensurate to the amount of time that the distributed download could reasonably take. Later, when the CE reports back to RNS server 104 in the third transmission of the protocol, message M3, the encrypted timestamp is decrypted and checked by RNS server 104 against its active list. If the timestamp is not present in the active list (e.g., because it has expired, or because a malicious client is trying to spoof it), the report is ignored. If the timestamp is on the list, it is used to determine whether the rest of the report is consistent and should be accepted. For instance, if the CE claims that a given peer took 2 minutes to transmit its data, but sends its report after 10 seconds, the report will be ignored. In various embodiments, upon expiration of its usefulness, each timestamp is deleted from the active list, so that it cannot be reused.

In the third transmission, message M3, after completion of the desired download, the CE sends back a report to RNS server 104 containing various statistics about the download, along with the encrypted timestamp "{UniqueTimeStamp}K_rkey". RNS server 104 decrypts the encrypted timestamp; if the decrypted timestamp matches one in the RNS server's active list, the report is accepted and the corresponding timestamp is removed from the active list; otherwise (e.g., because the timestamp has expired, or the CE is retransmitting a previously submitted report), the report is ignored. For each attempted download of a stripe from a peer location, the CE sends back a report in message M3 on that peer location's performance (containing the average downloading bandwidth "performance" from the peer location, or an indication of error if the download attempt failed), and a set of digests "digests" summarizing all the striped content downloaded from the same peer location, which can be used by RNS server 104 to determine whether the peer location supplied correct data.

Since the number of stripes, and thus the number of digests, can be large, in preferred embodiments, the total size of message M3 is reduced in a manner that both retains the resilience against content forgery (whether malicious or accidental, such as due to a hardware malfunction) as provided by MD5 hashing, and provides enough information to identify the source of any such forgery. In these embodiments, the digests are computed as follows:

A single random number (the "Salt") is first generated by the CE. The number is sent along with the report to RNS server 104. Further, the digest for a given peer location is obtained as follows:

(i) a bit vector is constructed by the CE to indicate which stripes have been received from the peer location of interest;
(ii) for each such stripe, an MD5 signature is computed by the CE from the stripe data received from the peer location;
(iii) all such MD5 signatures are XOR-ed together by the CE;
(iv) the CE appends the random salt to the result of (iii);
(v) a second MD5 is computed by the CE from the result of (iv);
(vi) the CE computes the stripe digest as a combination of: (1) a small digest, chosen as a portion of the latter MD5 obtained in step (v) in a predetermined manner; and (2) the bit vector constructed in step (i).

On RNS server 104 side, a reference signature is pre-computed as in step (i) above on the correct data for each stripe. Upon receiving the report, message M3, from the CE, the digests can be verified quickly by RNS server 104 by performing steps (iii)-(vi) on the reference signatures, based on the bit vector and the salt provided in the report, and comparing the results. The presence of the random salt in the computation ensures that the content stripes downloaded from a malicious or defective peer location cannot be successfully forged to produce the expected signature, even if small digests are used to reduce the bandwidth requirement for transmitting message M3. In a preferred embodiment, salt and digests of 32-bit length are used.

In various embodiments, the client component 116 follows a second protocol P2 to register its readiness to serve cached content (whether this is a binary executable 110 or content 202) with RNS server 104. For these embodiments, the first time the client component 116 communicates with RNS server 104 using protocol P2, it obtains a client ID from RNS server 104. This client ID is used by RNS servers 104 subsequently to track client computer 106, independent of its current network location (such as, for instance, network IP address and port number), as the network address of client computer 106 may change frequently, especially if it is dynamically assigned, e.g. by DHCP (Dynamic Host Configuration Protocol).

For these embodiments, the protocol is as follows (Protocol P2):

Protocol P2:
1. CC→RNS: REQUEST_ID: (Message M4)
2. RNS→CC: CHALLENGE: $\{CID, HCID\}_{K\_rand}$ (Message M5)
3. CC→RNS: CACHE: CID, HCID, IP:port, connection_speed, file_URL (Message M6)

In the first transmission, message M4, the client component 116 sends a REQUEST_ID message to RNS server 104 to request a new client ID. In response to message M4, RNS server 104 generates a new, unique, client ID "CID", and hashes this "CID" with a secret function only known to RNS server 104, producing a hashed client ID "HCID". The RNS server 104 then generates a (short) random key "K_rand", and encrypts the pair (CID, HCID) using a symmetric encryption algorithm known to both the RNS server 104 and the client component 116.

The resulting value "{CID, HCID}K_rand" is then returned to the client component 116 via the second transmission, message M5. No client-specific information needs to be stored by RNS server 104 at this point.

To complete the registration, the client component 116 breaks the encryption by exhaustively searching for the key K_rand, in order to uncover the pair (CID, HCID), which the client component then sends back to RNS server 104 along with its cache information via the third transmission, message M6. In preferred embodiments, for privacy reasons, the client component's IP address and IP port information may be additionally encrypted with the public key of RNS server 104 (not shown in the above) when included in message M6.

The protocol advantageously foils attacks by a maliciously modified or defective client component 116 that continuously attempts to request CIDs from RNS server 104 by sending messages M4. By forcing each client component 116 to solve a somewhat computationally expensive challenge (requiring, e.g., a few seconds of computing time), and by delaying any committal of information to RNS memory until the challenge has been solved, this protocol imposes a limitation on the rate at which an attacker can maliciously flood RNS server 104 from any single client computer 106, while having only an insignificant impact on legitimate transactions.

If the client component 116 has already obtained a pair (CID, HCID) from a previous interaction with RNS server 104, it follows a third protocol P3 to register with RNS server 104 whenever it comes online:

Protocol P3:
1. CC→RNS: CACHE: CID, HCID, IP:port, connection_speed, file_URL (Message M7)

The only transmission consists of client component 116 sending, in message M7, its previously obtained pair (CID, HCID) to RNS server 104, along with the cache information, exactly as in the third step, message M6, of the earlier described transmission protocol P3. Upon receipt of message M7, RNS server 104 updates its information about the client component 116 without incurring any new memory requirement. This information is resent periodically by client component 116, to tell RNS server 104 that it is still alive and ready to serve content.

Since pairs (CID, HCID) cannot be practically forged, even if an attacker somehow obtained the (CID, HCID) pair of an existing client component 116, the potential for damage is limited to that of misleading RNS server 104 about that particular client component 116—soon to be included in download reports, messages M7, generated by other client entities to report bad peer locations, which as will be described below, will prompt RNS server 104 to blacklist that client component 116 without further consequence.

Selection and Scheduling of Peer Locations

One embodiment of the method used by RNS server 104 to select peer locations 108a-108b to be returned to the CE in the message M2 of protocol P1above, will now be described referencing FIG. 3.

As illustrated, the peer locations registered with RNS server 104 are divided into a number of peer location pools, e.g. peer location pools 302a-302d, according to the type and speed of their connections to the Internet. Peer location pools 302a-302d are ordered according to their speed, whereby pool 302a keeps track of the peer locations with the fastest connections, and pool 302d of the peer locations with the slowest connections, respectively. A peer location's initial assignment is based on the connection type as indicated by the user or as automatically detected by the CE, and reported by the CE to the RNS server 104 in messages M6 and M7, respectively, and is occasionally updated based on download reports, message M3. For the illustrated embodiment, two special pools (not shown in FIG. 3) are maintained for inactive and blacklisted peer locations, respectively.

Within each peer location pool 302a-302d, a number of peer location records PLRa1-PLRd3, with one peer location record corresponding to each peer location known to RNS server 104, are ordered in a priority queue (implemented, e.g., as a binary heap), prioritized by the peer location records' time of next availability (TNA). A TNA is associated by the RNS server 104 with each peer location record to indicate when the corresponding peer location will next become eligible as a download source. If the TNA is in the past (comparatively to the RNS server's virtual or real-time clock), the peer location can be selected immediately. A TNA in the future indicates that the peer location has been selected recently enough and is not yet eligible again to act as a download source.

In various embodiments, the actual selection process proceeds as follows:

To satisfy a request for peer locations received from a CE, message M1, the RNS server 104 descends the peer location pool list by decreasing order of speed; that is, the RNS server 104 starts with pool 302a, then proceeds to pool 302b, etc., until it has found enough peer locations to return, or until it has exhausted all the pools. From each peer location pool, RNS server 104 selects peer locations by increasing order of TNA, with the requirement that any selected TNA must be in the past. The selection process stops as soon as enough peer locations are collected, otherwise the process continues using the next peer location pool or until all peer location pools have been exhausted.

Sufficiency of the number peer locations selected in one embodiment is determined based on whether the aggregated bandwidth from these locations is expected to meet a desired download performance level governed by a policy parameter. When a peer location is selected from a peer location pool, its peer location record is removed from the corresponding queue and reinserted into the same queue with a TNA in the future, making that peer location ineligible for immediate reselection. The delay is chosen based on the peer location record's previous TNA and a maximum rate of selection (MRA), which is a policy parameter associated with each peer location based on user preference or predefined system parameters. The MRA specifies the maximum number of downloads allowed per unit of time. In various embodiments, to ensure that the MRA is respected, the delay added to the TNA (expressed in the same unit of time) is chosen to be equal to or greater than the inverse of the MRA. For example, if the MRA for a particular client computer is specified as 10 downloads per hour, the delay will be at least a tenth of an hour, i.e., 6 minutes.

Figure 3:
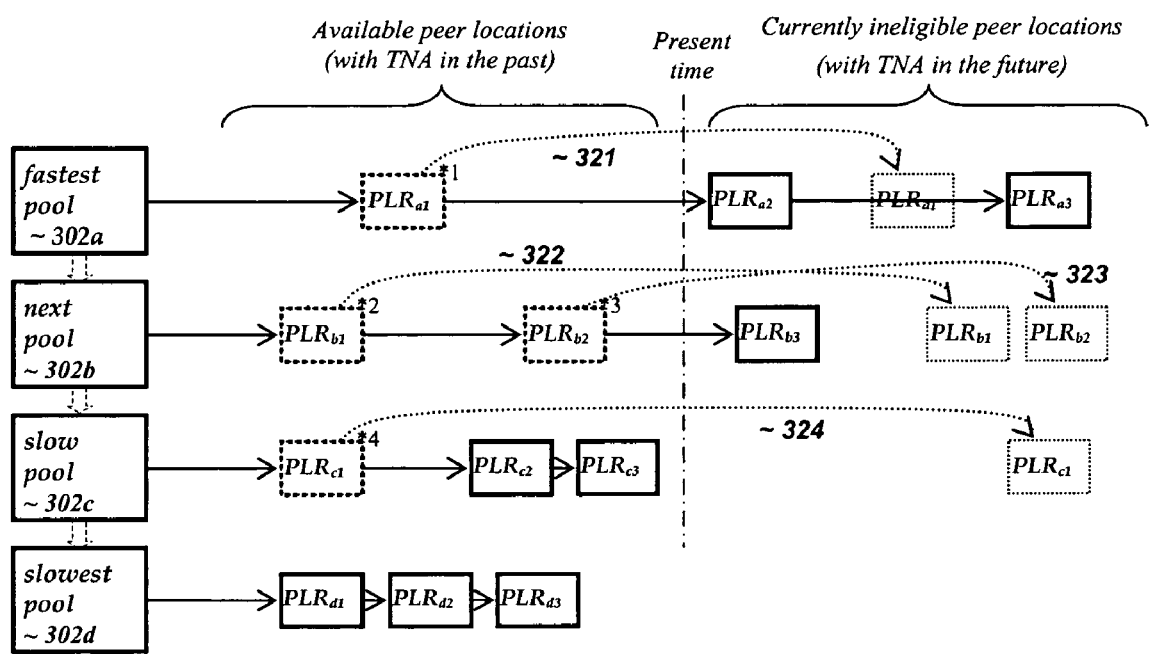
FIG. 3 further illustrates the present invention, the manner in which the RNS server schedules the various client components of the various peer locations to service the binary executables and content download requests, in accordance with one embodiment.

By way of example, FIG. 3 illustrates the selection of four peer locations. The RNS server 104 starts by first examining the fastest pool 302a. Only one peer location record, with a TNA in the past, PLRa1, exists in this pool. In step 321, this record is selected by RNS server 104, the peer location is included in the selection, and the peer location record PLRa1 is reinserted back into pool 302a with a TNA in the future. Following this, the RNS server 104 continues by examining the next pool 302b. Similarly to the above, peer location records PLRb1, PLRb2, and PLRc1 are selected in steps 322, 323, and 324, respectively.

In preferred embodiments, RNS server 104 receives (message M3) performance reports from the CEs performing the downloads, about the peer locations used for the downloads. These performance reports used to dynamically reassign peer location records to the appropriate pool. The assignment works as follows.

Upon initial registration, a peer location is assigned to a specific pool by RNS server 104, based on information provided by the peer location itself in message M1 about its type of connection to the Internet (such as T1, DSL, dial-up, etc.), as well as based on the observed ping time of RNS server 104 pinging the peer location.

Subsequently, after each download, the downloading client sends RNS server 104 a report in message M3 about the perceived speeds of the peer locations used for the download. RNS server 104 uses that information to assign positive or negative speed points to the peer location records corresponding to these peer locations. The speed points are associated with each peer location record, and accumulated with each received report, message M3. Whenever the speed point total for a peer location record reaches a positive (or negative, respectively) threshold, the peer location record is moved from its current pool to the next faster (or slower, respectively) pool, assuming it is not already in the fastest pool 302a (or the slowest pool 302d, respectively).

In various embodiments, RNS server 104 may receive two kinds of complaints about peer locations in message M3: failure to deliver content, or delivery of corrupted content. For these embodiments, the RNS server 104 awards the peer locations negative points corresponding to either type of complaint, and awards the peer locations positive points when positive download reports are received. The amount of points (positive or negative) awarded for each situation is application dependent, and may be determined on an empirical basis. When the point balance of the first type (failure to deliver content) reaches a predetermined threshold, the peer location record is temporarily moved from its current pool to the inactive pool, until the corresponding peer location registers again with RNS server 104. When the point balance for bad content reaches its threshold, however, the peer location record is moved to the blacklisted peer location pool (not shown in FIG. 3). In preferred embodiments, this move to the blacklisted peer location pool is permanent.

Example Computer System

Figure 4:
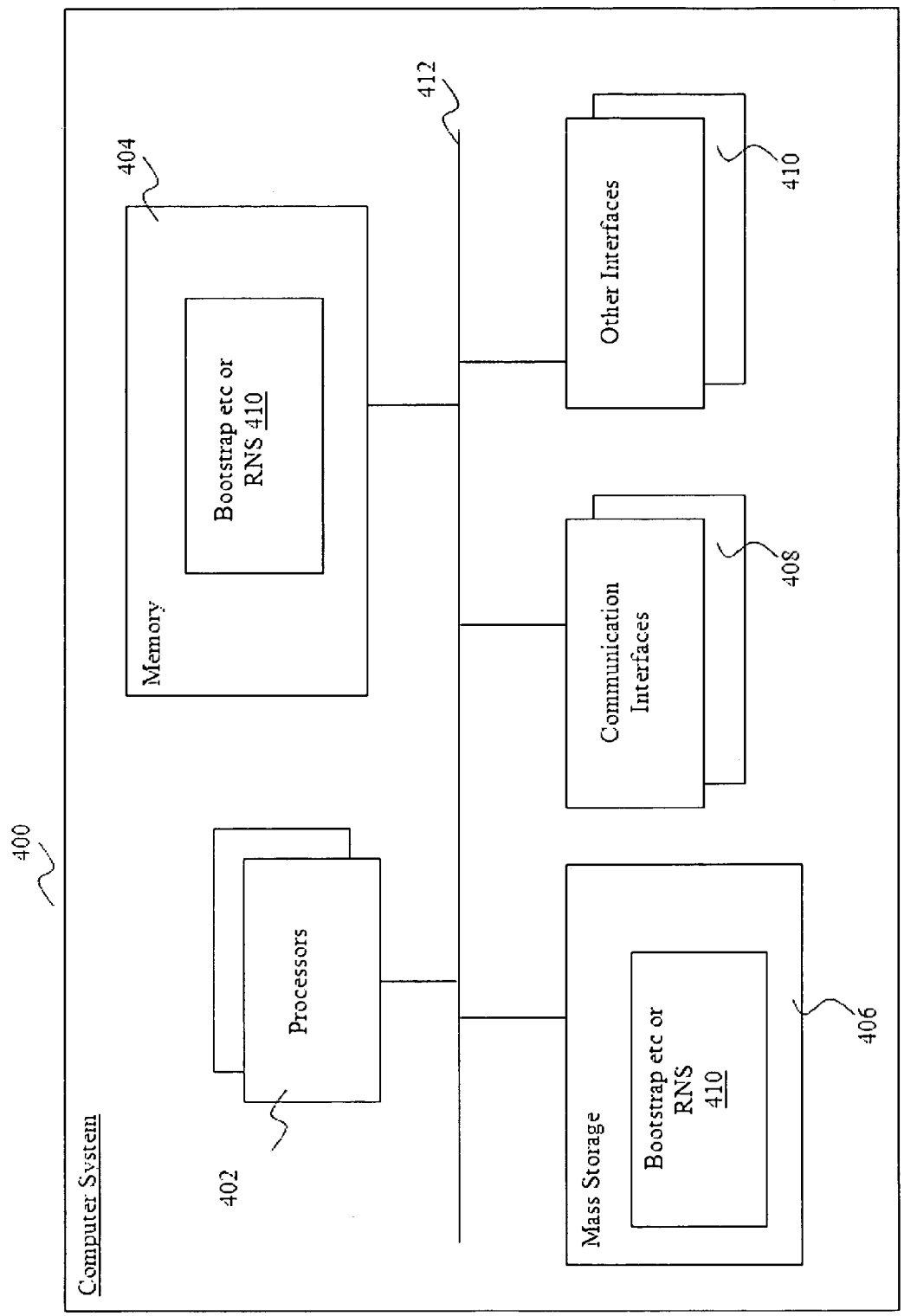
FIG. 4 illustrates an example computer system suitable for use to practice the present invention, in accordance with one embodiment.

FIG. 4 illustrates an exemplary computer system 400 suitable for use as either server 102, RNS server 104, or a client 106, 108a or 108b of FIG. 1 to practice the present invention. As shown, computer system 400 includes one or more processors 402 and system memory 404. Additionally, computer system 400 includes one or more mass storage devices 406 (such as diskette, hard drive, CDROM and so forth), communication interfaces 408 (such as network interface cards, modems and so forth), and one or more input/output devices 410 (such as keyboard, cursor control and so forth). The elements are coupled to each other via system bus 412, which represents one or more buses. In the case of multiple buses, they are bridged by one or more bus bridges (not shown). Each of these elements performs its conventional functions known in the art. In particular, system memory 404 and mass storage 406 are employed to store a working copy and a permanent copy of the programming instructions implementing the teachings of the present invention (i.e. instructions to provide bootstrap program 110 in response to requests for the installation files of client software 114, services of RNS server 104, bootstrap program 112, client component 116 and so forth). The permanent copy of the programming instructions may be loaded into mass storage 406 in the factory, or in the field, as described earlier, through a distribution medium (not shown) or through communication interface 408 (from a distribution server (not shown). The constitution of these elements 402-412 are known, and accordingly will not be further described.

Modifications and Alterations

While the present invention has been described referencing the illustrated and above enumerated embodiments, the present invention is not limited to these described embodiments. Numerous modification and alterations may be made, consistent with the scope of the present invention as set forth in the claims to follow.

For example, boot program 112 may obtain the desired binary executable 110 or content 202 from less than all the peer locations returned by RNS server 104, e.g., if boot program 112 determines that only using a few of the peer locations will satisfy its needs.

in an embodiment where integrity of the download is of lesser importance, and either a verification scheme that does not have a strong dependency on the downloads being obtained in stripes of a specified size from all the peer locations returned by RNS server 104 or no verification is practiced, boot program 112 may instead obtain the desired binary executable 110 or content 202 from less than all the returned peer locations and may not constrain the sizes of the downloaded stripes.

Client component 116 may be further equipped to protect the client computers against denial-of-service attacks. Specifically, client component 116 may be equipped to monitor the average bandwidth used for servicing download requests from other clients, and the time of last download, and simply refuse all incoming download requests for a given period of time if a threshold has been exceeded. The threshold can be either static or can be configured as a function of the average network bandwidth used by the client computer on which client component 116 is running.

Of course, the above examples are merely illustrative. Based on the above descriptions, many other equivalent variations will be appreciated by those skilled in the art.

CONCLUSION AND EPILOGUE

Thus, a method and apparatus for distributing binary executables and content in a distributed manner has been described. Since as illustrated earlier, the present invention may be practiced with modification and alteration within the spirit and scope of the appended claims, the description is to be regarded as illustrative, instead of being restrictive on the present invention.

What is claimed is:

1. In a resource naming service server, a method of operation comprising: receiving registrations of a first plurality of client computers as peer locations that cache a collection of binary executables; receiving corresponding performance data for downloading one or more portions of said collection of binary executables from said first client computers;
   scheduling said first client computers for inclusion among a list of peer locations that cache said resource;
   returning the list of peer locations that cache said resource to a second client computer requesting peer locations that cache said collection of binary executables:
   receiving a request for a plurality of peer locations of said collection of binary executables from at least a third client computer, identifying one or more of said first client computers as peer locations of said collection of binary executables, and receiving corresponding performance data from said third client computer for downloading one or more portions of said collection of binary executables from at least one of said identified first client computers; and
   generating a composite verification signature for the binary executable portions including employment of a random number provided by said third client computer, and then generating a verification digest for each downloaded binary executable portion based at least in part on a portion of the composite signature to facilitate determination of whether the third client computer received the collection of binary executables in portions from contacted ones of the identified client computers client computers correctly.

2. The method of claim 1, wherein the method further comprises receiving registration of said second client computer to become a peer location that caches the collection of binary executables.

3. The method of claim 1, wherein said receiving of registrations comprises for each of said first plurality of client computers, first receiving a request from the client computer for a client identifier, in response, providing the client identifier in an encrypted plain and hashed pair form, and receiving back from the client computer the plain and hashed pair.

4. The method of claim 1, wherein the method further comprises providing a timestamp along with said identification of one or more of said first client computers as peer locations of said collection of binary executables, and receiving said provided timestamp back along with said reporting of corresponding performance data from said third client computer for downloading one or more portions of said collection of binary executables from at least one of said identified first client computers.

5. The method of claim 1, wherein the method further comprises conditionally blacklisting one or more of said first client computers based on the result of said determination of whether the third client computer received the collection of binary executables in portions from contacted ones of the identified client computers correctly.

6. The method of claim 1, wherein the method further comprises organizing said first client computers into a plurality of peer location pools of different performance levels in accordance with said received performance data, and said scheduling comprises scheduling said first client computers of a peer location pool of a higher performance level first before scheduling said first client computers of a peer location pool of a lower performance level.

7. The method of claim 6, wherein said the method further comprises moving selected ones of said first client computers from one peer location pool of a first performance level to another peer location pool of a second performance level in accordance with said received performance data.

8. In a resource naming service server, a method of operation comprising:
   receiving a request from a client computer for a plurality of peer locations of a resource; in response, identifying one or more peer locations for the client computer, including a timestamp; and receiving performance data from the client computer for downloading the resource in portions from one or more of said identified peer locations, including said timestamp, to enable determination of whether to accept the received performance data; and
   generating a composite verification signature for the binary executable portions including employment of a random number provided by said client computer and then generating a verification digest for each downloaded binary executable portion based at least in part on a portion of the composite signature determination of whether the client computer received the resource in portions from contacted ones of the identified peer locations correctly.

9. An apparatus comprising:
   storage medium having stored therein a plurality of programming instructions designed to implement a resource naming service, including a registration service to register a first plurality of client computers as peer locations that cache a collection of binary executables, a reporting service to receive corresponding performance data for downloading one or more portions of said collection of binary executables from said first client computers, and a scheduler to schedule said first client computers for inclusion among a list of peer locations that cache said resource to be returned to a second client computer requesting for peer locations that cache said collection of binary executables; and
   a processor coupled to the storage medium to execute said plurality of programming instructions,
   wherein the scheduler further receives request for a plurality of peer locations of said collection of binary executables from at least a third client computer identifies one or more of said first client computers as peer locations of said collection of binary executables and the reporter receives corresponding performance data from said third client computer for downloading one or more portions of said collection of binary executables from at least one of said identified first client computers, and wherein for each reporting, the reporting service further generates a composite verification signature for the binary executable portions including employment of a random number provided by the reporting client computer, and then generating a verification digest for each downloaded binary executable portion based at least in part on a portion of the composite signature to facilitate determination of whether the reporting client computer received the collection of binary executables in portions from contacted ones of the first client computers correctly.

10. The apparatus of claim 9, wherein the registration service further receives registration of said second client computer to become a peer location that caches the collection of binary executables.

11. The apparatus of claim 9, wherein said registration service, first receives, for each of said first plurality of client computers, a request from the client computer for a client identifier, in response, provides the client identifier in an encrypted plain and hashed pair form, and receives back from the client computer the plain and hashed pair.

12. The apparatus of claim 9, wherein the scheduler further provides a timestamp along with said identification of one or more of said first client computers as peer locations of said collection of binary executables, and the reporter receive said provided timestamp back along with said reporting of corresponding performance data from said third client computer for downloading one or more portions of said collection of binary executables from at least one of said identified first client computers.

13. The apparatus of claim 9, wherein the scheduler further conditionally blacklists one or more of said first client computers based on the result of said determination of whether the third client computer received the collection of binary executables in portions from contacted ones of the first client computers correctly.

14. The apparatus of claim 9, wherein the scheduler further organizing said first client computers into a plurality of peer location pools of different performance levels in accordance with said received performance data, and said scheduler schedules said first client computers of a peer location pool of a higher performance level first before scheduling said first client computers of a peer location pool of a lower performance level.

15. The apparatus of claim 14, wherein said scheduler further moves selected ones of said first client computers from one peer location pool of a first performance level to another peer location pool of a second performance level in accordance with said received performance data.

16. An apparatus comprising:

storage medium having stored therein a plurality of programming instructions designed to implement a resource naming service, including a scheduler designed to receive a request from a client computer for a plurality of peer locations of a resource, and in response, identify one or more peer locations for the client computer, including a timestamp, and a reporter to receive performance data from the client computer for downloading the resource in portions from one or more of said identified peer locations, including said timestamp, to enable determination of whether to accept the received performance data; and one or more processor coupled to the storage medium to execute the programming instructions, wherein the reporter further generates a composite verification signature for the binary executable portions including employment of a random number provided by said client computer, and then generating a verification digest for each downloaded binary executable portion based at least in part on a portion of the composite signature determination of whether the client computer received the resource in portions from contacted ones of the identified peer locations correctly.

* * * * *